United States Patent [19]

Tanaka et al.

[11] Patent Number: 4,893,896

[45] Date of Patent: Jan. 16, 1990

[54] ENERGY TRANSMISSION OPTICAL FIBER

[75] Inventors: Hiroyuki Tanaka; Takeshi Satake; Toshikazu Gozen; Toshiya Suzuki; Atsushi Utsumi, all of Itami, Japan

[73] Assignee: Mitsubishi Cable Industries, Ltd., Amagasaki, Japan

[21] Appl. No.: 216,382

[22] Filed: Jul. 8, 1988

[30] Foreign Application Priority Data

Jul. 10, 1987 [JP] Japan ............................. 62-106229[U]
Feb. 26, 1988 [JP] Japan ................................... 63-44847

[51] Int. Cl.$^4$ ................................................ G02B 6/10
[52] U.S. Cl. ................................. 350/96.31; 350/96.30
[58] Field of Search ............... 350/96.29, 96.30, 96.31, 350/96.32, 96.33, 96.34

[56] References Cited

U.S. PATENT DOCUMENTS

| | | | |
|---|---|---|---|
| 4,025,156 | 5/1977 | Gloge et al. | 350/96.34 X |
| 4,165,152 | 8/1979 | Shiraishi et al. | 350/96.31 X |
| 4,392,715 | 7/1983 | Bonewitz et al. | 350/96.34 X |
| 4,435,040 | 3/1984 | Cohen et al. | 350/96.33 |
| 4,690,500 | 9/1987 | Hayami et al. | 350/96.24 X |
| 4,733,939 | 3/1988 | Utsumi et al. | 350/96.3 |

Primary Examiner—William L. Sikes
Assistant Examiner—Akm E. Ullah
Attorney, Agent, or Firm—Burns, Doane, Swecker & Mathis

[57] ABSTRACT

The present invention relates to an energy transmission optical fiber which is a medium for transmitting high-energy beams within an ultraviolet range such as laser beams. Since an optical fiber according to the present invention comprises a core formed of pure silica and a clad having a graded index type distribution of refractive index and said clad is disposed on an interface between the core and the clad where many structural defects are generated, the transmission loss is not increased even after the transmission of high-energy beams for a long time. In addition, since the optical fiber according to the present invention comprises the core formed of pure silica having a high melting point, the high-energy beams can be transmitted without generating a melting fracture in the core.

9 Claims, 7 Drawing Sheets

ENERGY TRANSMISSION OPTICAL FIBER

BACKGROUND OF THE INVENTION

1. Field of the Invention

The present invention relates to an optical fiber which is a medium for transmitting high-energy beams within an ultraviolet range such as laser beams.

2. Description of the Prior Art

In the case where, by applying high-energy beams such as laser beams, such as medical uses where a diseased tissue is treated or in industrial uses where iron plates and the like are subjected to drilling, cutting and welding, an optical fiber has been used as a medium for transmitting high-energy beams. In order to transmit the energy of these high-energy beams efficiently, a low transmission loss is required for an optical fiber used for such a use. In addition, since the optical transmission loss changes in some conditions with time, it is desired that the optical fiber is superior in not only its initial characteristics but also in its characteristics over time. A problem has occurred particularly in that the characteristics deteriorate rapidly when ultraviolet rays are transmitted.

A communication optical fiber with a reduced transmission loss has been proposed for example in Japanese patent appln. publication No. 7762/1985, Japanese patent appln. publication No. 3020/1985 and Japanese patent appln. laid-open No. 62204/1981 but no energy transmission optical fiber for transmitting high-energy beams superior particularly in characteristics over time has been proposed.

SUMMARY OF THE INVENTION

The present invention has been achieved for solving the above described problem. An optical fiber according to the present invention comprises a core formed of pure silica and a clad having a GI (graded index) type distribution of refractive index.

Thus, it is a first object of the present invention to provide an energy transmission optical fiber in which transmission loss is not increased for a long time even in the case where high-energy beams are transmitted.

It is a second object of the present invention to provide an energy transmission optical fiber capable of stably transmitting high-energy beams for a long time.

It is a third object of the present invention to provide an energy transmission optical fiber capable of reducing a transmission loss of high-energy beams.

It is a fourth object of the present invention to provide an energy transmission optical fiber not bringing about a melting fracture even in the case where high-energy beams are transmitted.

The above and further objects and eatures of the invention will more fully be apparent from the following detailed description with accompanying drawings.

DESCRIPTION OF THE PREFERRED EMBODIMENTS

The preferred embodiments of the present invention will be concretely described below.

Figure 1:
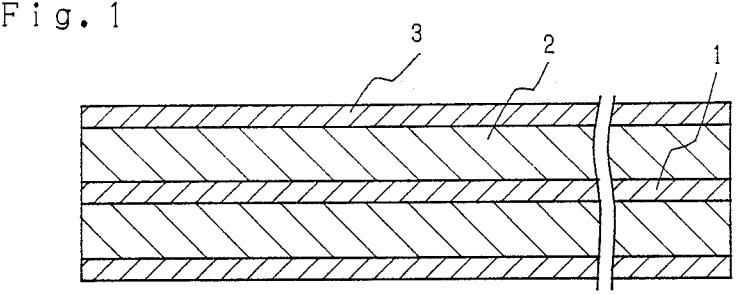
FIG. 1 is a longitudinal sectional view showing a first preferred embodiment of an energy transmission optical fiber according to the present invention.
Figure 2:
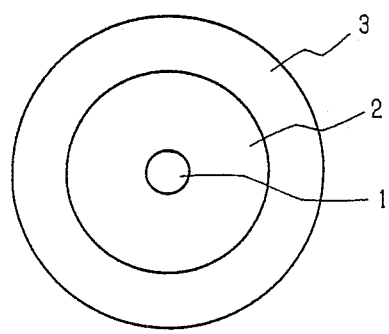
FIG. 2 is a cross sectional view of the first preferred embodiment.
Figure 3:
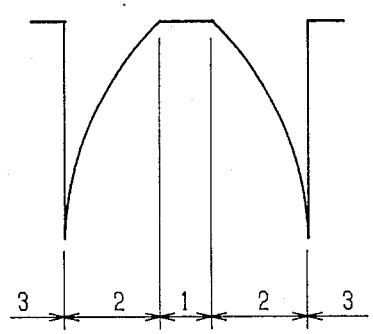
FIG. 3 is a diagram showing a distribution of refractive index in a cross sectional view of the first preferred embodiment shown in FIG. 1.

FIG. 1 is a longitudinal sectional view showing a first preferred embodiment of an energy transmission optical fiber according to the present invention, FIG. 2 being a cross sectional view of the first preferred embodiment shown in FIG. 1, and FIG. 3 being a diagram showing a distribution of refractive index in a cross sectional view of the first preferred embodiment.

Referring now to FIGS. 1 to 3, reference numeral 1 designates a core formed of pure silica having a uniform refractive index all over the section thereof (refer to FIG. 3). A clad 2 having a refractive index reduced by doping dopants, such as $BF_3$, $B_2O_3$ and F, to silica is disposed outside of the core 1. A refractive index of the clad 2 is gradually reduced from an inner circumferential side toward an outer circumferential side as in a GI type optical fiber (refer to FIG. 3). A support layer 3 having an appointed refractive index nearly same as that of the core 1 is disposed outside of the clad 2. In addition, a diameter of the core 1 can be suitable determined taking a size of an optical fiber, a magnitude of the energy to be transmitted, an incidental diameter of beams upon the optical fiber and the like into consideration.

Figure 4:
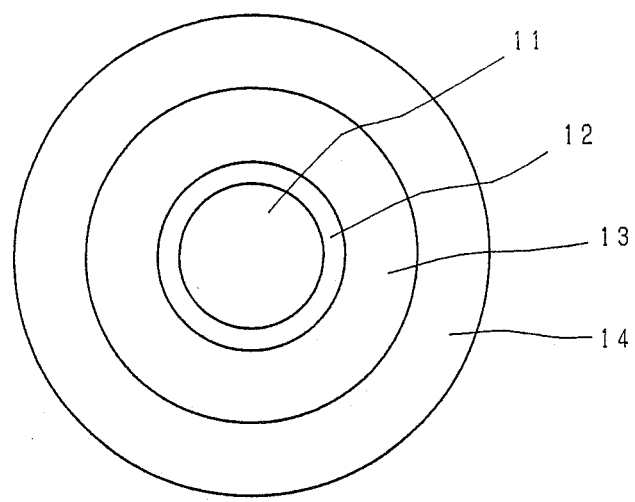
FIG. 4 is a cross sectional view showing a second preferred embodiment of an energy transmission optical fiber according to the present invention.
Figure 5:
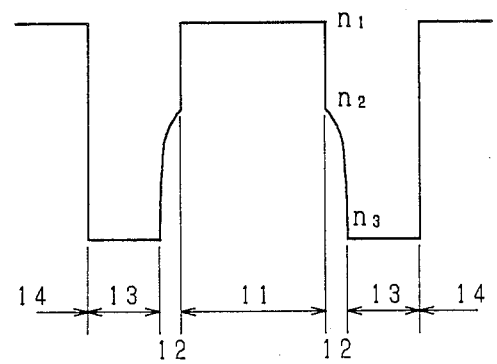
FIG. 5 is a diagram showing a distribution of refractive index in a cross sectional view of the second preferred embodiment shown in FIG. 4, FIG. 6 i a graph showing a relation between an OH-group in a core and a transmission loss.

FIG. 4 is a cross sectional view showing the second preferred embodiment of an energy transmission optical fiber according to the present invention and FIG. 5 is a diagram showing a distribution of refractive index in a cross sectional view of the second preferred embodiment shown in FIG. 4.

Referring to FIGS. 4, 5, reference numeral 11 designates a core formed of pure silica containing an OH-group at a content of 500 ppm or more and having a uniform refractive index $n_1$ all over the section thereof. This pure silica does not contain any dopant for adjusting the refractive index but contains inevitable impurities. It leads to an enhanced transmissivity of high-energy beams to contain an OH-group at a content of 500 ppm or more.

Figure 6:
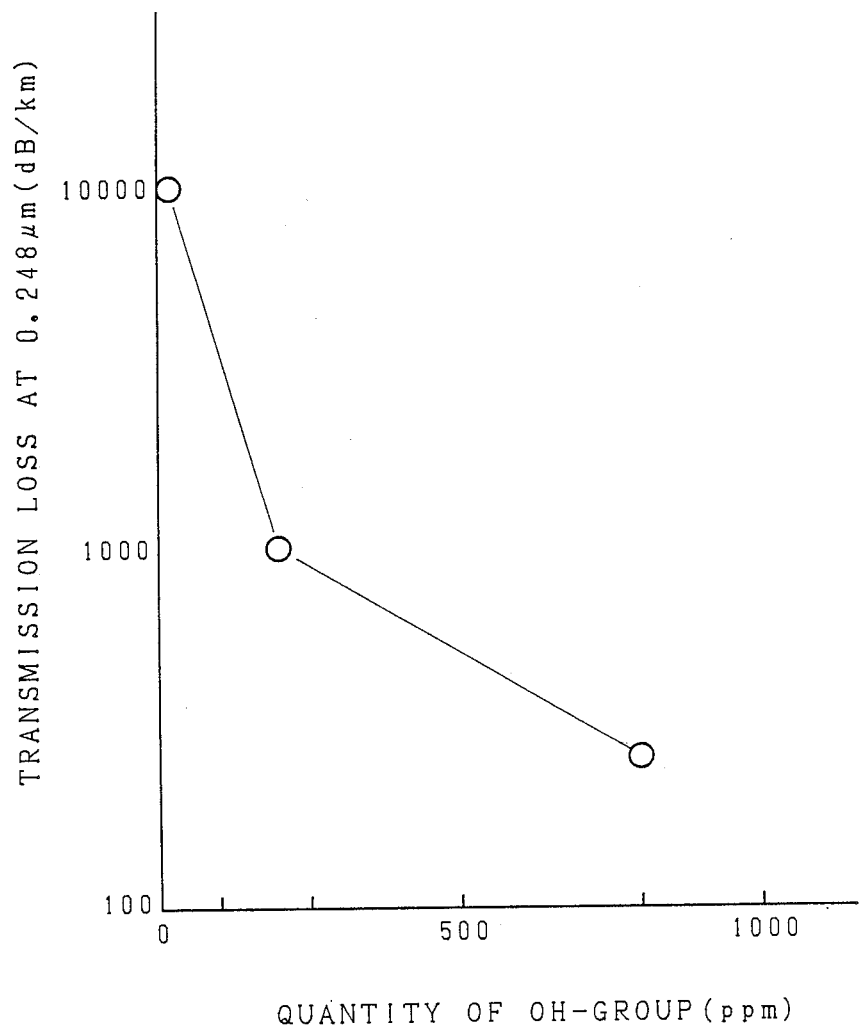

FIG. 6 is a graph showing characteristics of pure silica with indicating a quantity of OH-group on an axis of abscissa and a transmission loss of high-energy beams having a wavelength of 0.248 μm. It is found from this graph that the transmission loss is low to an extent of 500 dB/km or less at a content of 500 ppm or more of OH-group.

A thin first clad 12 is disposed outside of the core 11. The first clad 12 is a layer formed of $SiO_2$ containing dopants, such as $BF_3$, B or F, to reduce the refractive index. It is important that the refractive index is gradually reduced from an inner circumferential side toward an outer circumferential side as in a GI type optical fiber. The refractive index $n_2$ of the innermost circumferential side is lower than that $n_1$ of the core (refer to FIG. 5).

Figure 7:
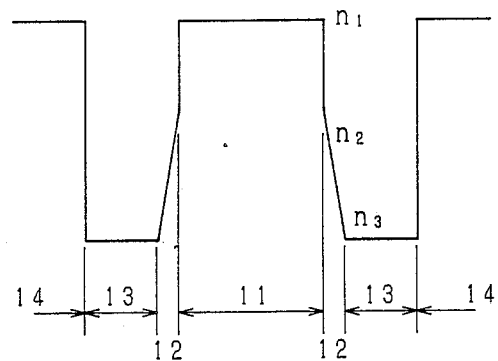
FIGS. 7, 8 are diagrams showing other distributions of refractive index in a cross sectional view of the optical fiber shown in FIG. 4.
Figure 8:
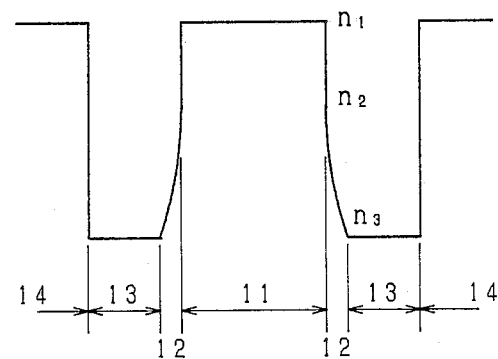

Provided that a refractive index of a second clad 13 disposed outside of the first clad 12 in $n_3$, in order to obtain a desired effect, it is desired to select $(n_1-n_2)$ at a value of 80% of less of $(n_1-n_3)$ because in the case where it exceeds 80%, the desired effect can not be attained in the prevention of the deterioration with a lapse of time. The slope from $n_2$ to $n_3$ may be either linear or parabolic. FIG. 7 shows a case where the slope is linear (the gradual reduction ratio is constant) and FIG. 8 shows a case where the slope is parabolic.

In addition, a thickness of the first clad 12 is at least 5 μm because if it is 5 μm or less, the desired effect can not be attained in the prevention of the deterioration with a lapse of time.

Figure 9:
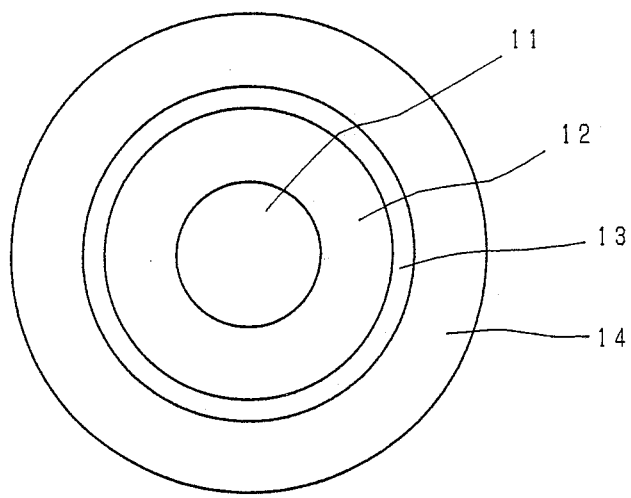
FIG. 9 is a cross sectional view showing a modification of the second preferred embodiment of an energy transmission optical fiber according to the present invention.
Figure 10:
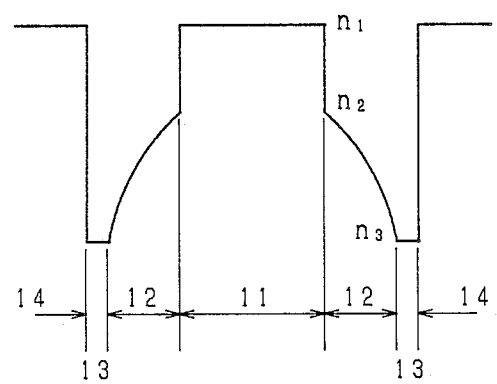
FIG. 10 is a diagram showing a distribution of refractive index in a cross sectional view of this modification.

The second clad 13 having a refractive index of $n_3$ is disposed outside of the first clad 12. The second clad 13 has the refractive index $n_3$ ($<n_2<n_1$) by doping $BF_3$, B or F. In the preferred embodiment shown in FIG. 4 the second clad 13 has a sufficient thickness in comparison with the first clad 12. FIGS. 9, 10 show a case where the second clad 13 is thin in comparison with the first clad 12. Also such the construction meets the condition as an energy transmission optical fiber according to the present invention.

A support layer 14 formed of pure silica having an almot the same refractive index as that of the core 11 is disposed outside of the second clad 13. In additionn, also an optical fiber not provided with this support layer 14 meets the condition of the present invention. In this case, a thinner fiber can be provided.

The above described optical fiber is manufactured by forming a tube, in which layers for forming the second clad 13 and the first clad 12 are formed by the CVD (chemical vapor deposition) method, in a pipe formed of pure silica to be formed as the support layer 14, inserting a rod formed of pure silica, which has been previously adjusted in content of OH-group, to be formed as the core 11 into the resulting tube, and melting the resulting assembly to form a preform followed by drawing. Although the layer for forming the first clad 12 is formed by being supplied for example $BF_3$ and $SiCl_4$, the desired distribution of refractive index can be attained by gradually reducing a quantity of $BF_3$ supplied. In addition, a GI layer, such as the first clad 12, may be disposed between the support layer 14 and the second clad 13.

Figure 11:
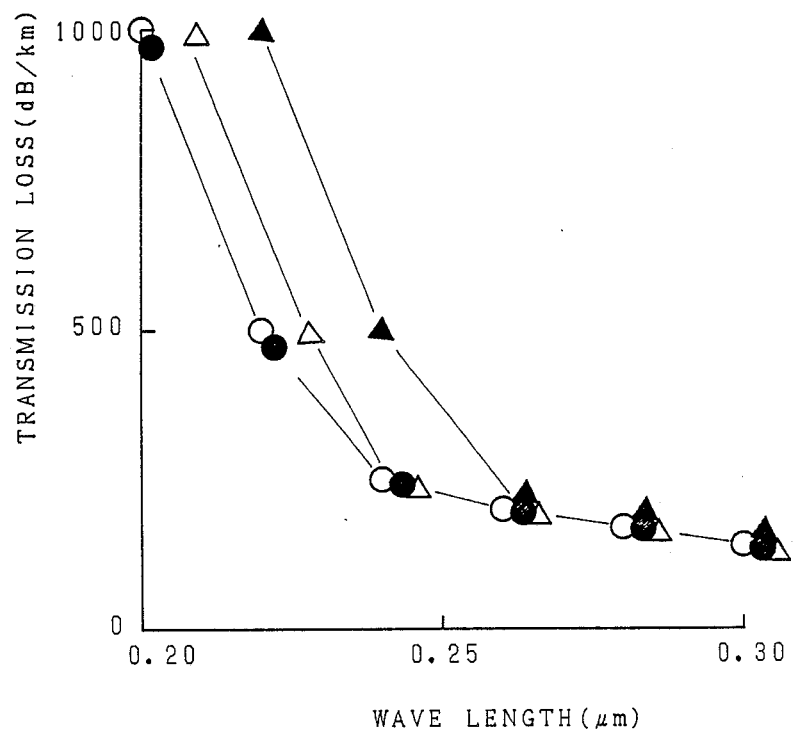
FIG. 11 is a graph showing a relation between a transmission loss and a wavelength.

FIG. 11 shows the measurement results of the transmission loss of the optical fiber according to the present invention with indicating a wavelength on an axis of abscissa and a transmission los on an axis of ordinate. Referring to FIG. 11, marks ○ show initial characteristics of a sample 1, which is a product of the present invention, and marks Δ show characteristics of the product of the present invention (sample 1) after the transmission thereupon of a light having an intensity of 0.7 joule from a $D_2$ lamp for 100 hous. Marks ● show initial characteristics of a sample 2, which is a conventional product, and marks ▲ show characteristics of the conventional product (sampel 2) after the transmission thereupon of a light having an intensity of 0.7 joule from a $D_2$ lamp for 100 hours. The specification of the sample 1 and the sample 2 is shown in Table 1.

TABLE 1

| Item | Sample 1 (product of the present invention) | Sample 2 (conventional product) |
|---|---|---|
| Diameter of the core (μm) | 400 | 400 |
| Thickness of the first clad (μm) | 15 | 0 |
| Thickness of the second clad (μm) | 5 | 20 |
| Outside diameter of the optical fiber (μm) | 500 | 500 |
| $(n_1 - n_3)/(n_1 \times 100$ (%) | 1 | 1 |
| $(n_1 - n_2)/(n_1 - n_3) \times 100$ (%) | 50 | 100 |

As obvious from FIG. 11, the product of the present invention shows no increase of transmission loss even after the transmission of high-energy beams thereupon.

Figure 12:
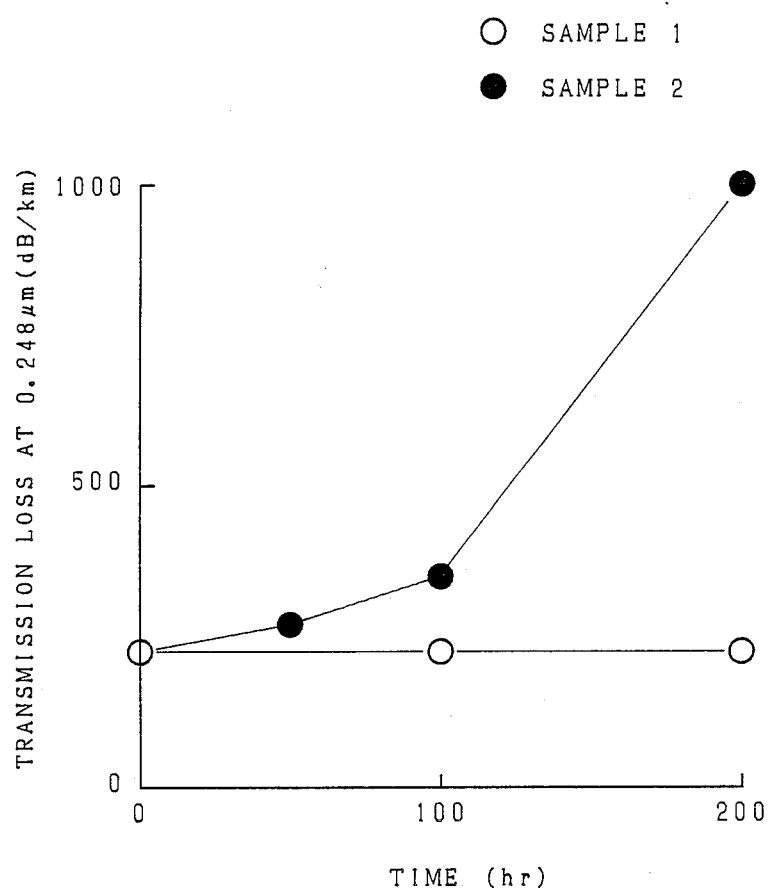
FIG. 12 is a graph showing a change of a transmission loss with a lapse of time.

FIG. 12 shows a change of transmission loss of the samples 1, 2 at a wavelength of 0.248 || m with a lapse of time. The product of the present invention (sample 1) shows no increase of loss even after the lapse of 200 hours while the conventional product (sample 2) shows an increase of loss already after the lapse of 50 hours.

In addition, samples 3, 4, which are products of the present invention, having a specification shown in the following Table 2 were tested on transmission loss under the same conditions as for the sample 1 and almost the same characteristics as for the sample 1 were gained.

TABLE 2

| Item | Sample 3 (product of the present invention) | Sample 4 (product of the present invention) |
|---|---|---|
| Diameter of the core (μm) | 400 | 400 |
| Thickness of the first clad (μm) | 5 | 15 |
| Thickness of the second clad (μm) | 15 | 5 |
| Outside diameter of the optical fiber (μm) | 500 | 500 |
| $(n_1 - n_3)/n_l \times 100$ (%) | 1 | 1 |
| $(n_1 - n_2)/(n_1 - n_3) \times 100$ (%) | 30 | 80 |

The above described samples 1, 3, 4, which are the products of the present invention, contain an OH-group in the core at a content of 800 ppm.

Although the mechanism of excellent high-energy beam transmission characteristics of the optical fiber according to the present invention has never been made clear, it is generally presumed as follows:

That is to say, the optical fiber transmits beams by means of the core and the circumference of the core but the color centers in the core 11 are formed by the action of beams or their heat energy during its long-term use to bring about the transmission loss. And, the color centers of this type aree brought about in a large quantity in portions where the structure is changed, in short, on an interface between the core and the clad, but in the opti- -cal fiber according to the present invention the first clad 12 exists on that interface, so that the refractive index, in short, the structure is gradually changed between the core 11 and the second clad 13, whereby the color centers are reduced. In addition, the beams to be transmitted are apt to be oozed out into the clad due to the existence of the first clad 12 to reduce an energy density in the circumferential surface of the core 11, and as a result, the formation of the color centers is suppressed in that portion.

As above described, since the transmission loss of the optical fiber according to the present invention is not increased for a long time even in the case where the high-enery beams are transmitted, in short, the transmissivity of beams is not deteriorated for a long time, the high-energy beams can be stably transmitted for a long time.

In addition, in the case where the high-energy beams are incident upon the core, since the core is formed of pure silica having a melting point of about 2,200° C. which is remarkably higher than a melting point of silica containing dopants, such as germanium, of about 1,700° C., the melting fracture is not generated in the core.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or within the range of equivalence of such metes and bounds thereof are therefore intended to be embraced by the claims.

What is claimed is:

1. An energy transmission optical fiber comprising:
   a core formed of pure silica containing an OH-group at a content of 500 ppm or more, and having a core refractive index which is constant in a radial direction;
   a first clad disposed around said core and having a first refractive index which has a first value at an inner circumferential side which is less than said core refractive index and which gradually decreases in an outward radial direction; and
   a second clad disposed around said first clad and having a second refractive index which is constant in a radial direction.

2. An energy transmission optical fiber as set forth in claim 1, in which the value of said core refractive index is $n_1$, the first value is $n_2$, and the value of the second refractive index is $n_3$, in which $$(n_1-n_2)/(n_1-n_3) \leq 0.8.$$

3. An energy transmission optical fiber as set forth in claim 1, in which a thickness of said first clad is at least 5 μm.

4. An energy transmission optical fiber as set forth in claim 1, in which the first refractive index is gradually reduced at the constant ratio in the outward radial direction.

5. An energy transmission optical fiber as set forth in claim 1, in which the first refractive index is gradually reduced at an indefinite ratio in the outward radial direction.

6. An energy transmission optical fiber as set forth in claim 1, in which said first clad is thinner than said second clad.

7. An energy transmission optical fiber as set forth in claim 1, in which said first clad is thicker than said second clad.

8. An energy transmission optical fiber as set forth in claim 1, in which support lager formed of pure silica having a refractive index almost the same as said core refractive index is disposed outside of said second clad.

9. An energy transmission optical fiber as set forth in claim 1, in which said first clad is formed of silica containing dopants selected from the group consisting of $BF_3$, B and F.

* * * * *